(12) United States Patent
Christians

(10) Patent No.: US 6,504,491 B1
(45) Date of Patent: Jan. 7, 2003

(54) SIMULTANEOUS MULTI-DATA STREAM TRANSMISSION METHOD AND APPARATUS

(75) Inventor: Scott Christians, Buda, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/320,959

(22) Filed: May 27, 1999

(51) Int. Cl.$^7$ ............................................... G08G 1/123
(52) U.S. Cl. ....................... 340/988; 340/426; 342/139; 342/457; 180/287; 307/10.3; 375/243; 375/286; 375/340; 370/204
(58) Field of Search ................................. 340/988, 426, 340/539, 522.1, 10.1; 342/139, 457; 455/466; 701/200; 180/287; 307/10.2, 10.3; 370/342, 310, 204, 286; 375/222, 243, 247, 144, 148, 340, 145

(56) References Cited

U.S. PATENT DOCUMENTS

| | | | | |
|---|---|---|---|---|
| 4,196,418 A | * | 4/1980 | Kip et al. ................. 340/10.34 |
| 4,739,328 A | * | 4/1988 | Koelle et al. .................. 342/44 |
| 5,103,222 A | * | 4/1992 | Esch et al. .................. 340/10.1 |
| 5,105,190 A | * | 4/1992 | Kip et al. ................. 340/10.34 |
| 5,223,844 A | * | 6/1993 | Mansell et al. ............. 342/357 |
| 5,394,135 A | * | 2/1995 | Stadler ........................ 340/426 |
| 5,442,358 A | * | 8/1995 | Keeler et al. ................. 342/54 |
| 5,629,693 A | * | 5/1997 | Janky .......................... 340/988 |
| 5,805,585 A | * | 9/1998 | Javitt et al. .................. 370/342 |
| 5,898,391 A | * | 4/1999 | Jefferies et al. ............. 340/988 |
| 5,900,828 A | * | 5/1999 | Friedrichs ................... 340/988 |

* cited by examiner

Primary Examiner—Benjamim C. Lee
(74) Attorney, Agent, or Firm—Nicholas C. Hopman

(57) ABSTRACT

In a simultaneous multi-data stream transmission method and apparatus a first signal is transmitted at a fixed repetition rate from a first transceiver device (14). A second transceiver (33) then receives and demodulates the information embedded in the first signal and transmits a second signal back to the first transceiver device (14). The first transceiver (14) then receives and demodulates the information embedded in the second signal and modifies the repetition rate to another rate. A wireless receiving device (10) detects the another repetition rate of the transmitted first signal and takes action dependent on the designed application.

20 Claims, 2 Drawing Sheets

SIMULTANEOUS MULTI-DATA STREAM TRANSMISSION METHOD AND APPARATUS

FIELD OF THE INVENTION

The present invention relates generally to synthesizing signals that have more than one meaning and using these signals to effect different actions. These signals can be useful for wirelessly controlling multiple devices.

BACKGROUND OF THE INVENTION

Wireless control of multiple devices via a singular signal has many applications. One example of a useful application is in vehicle theft and recovery. Vehicle theft continues to be an ongoing problem. Accordingly, various anti-theft devices have been proposed and are currently in use. Some anti-theft devices are operable to disable one or more vehicle operating systems, thereby disabling the vehicle. Other anti-theft devices use a tracking system to locate and retrieve stolen vehicles. Such vehicle recovery apparatus generally includes a central transmitter, a locator module attached to the vehicle to be recovered, and one or more locating towers. The central transmitter is adapted to send a call signal in response to a report of a stolen vehicle. A receiver in the locator module attached to the vehicle responds to the call signal and activates a location transmitter. The location transmitter generates a tracking signal which is received by the locating towers. The locating towers use the tracking signal to develop vehicle location information As a result, the vehicle recovery apparatus is able to locate a vehicle based on certain parameters of the received locator signal, such as signal strength.

The effectiveness of recovery systems is predicated upon installing the locator module in a concealed location in the vehicle. Otherwise, the locator module may be removed from the vehicle, rendering the recovery apparatus useless. It is also desirable for any disabling apparatus to be similarly concealed.

While these previous vehicle recovery systems have proven reliable, unfortunately they are not infallible. Stolen vehicles having conventional recovery apparatus may be driven into areas in which transmission of the tracking signal is blocked or distorted. For example, the tracking signal typically does not transmit clearly through metal structures. As a result, the previous vehicle recovery systems are not entirely effective.

It has been proposed to provide disabling apparatus with existing recovery apparatus to thereby disable the vehicle until it may be located and recovered. One approach incorporates a VHF band radio receiver (including full demodulation) in the disable module which would activate the disable module in response to either the call signal or the tracking signal. Such systems which require a VHF band radio receiver, however, are overly expensive and require overly complex demodulation. In the alternative, it has been proposed to modify the locator module so that it separately communicates activated status using a radio frequency transmitter and receiver scheme similar to remote keyless entry systems. While this approach would allow the disable module to use less expensive receivers, a separate low power transmitter must be installed in the locator module. Yet another proposed approach would connect a data wire between the locator module and the disable module. This approach, however, may allow a thief to find and remove the locator module and disable module simply by following the connection from the vehicle operating system to the disable module and then following the data wire to the locator module.

Thus, there is a need for disable module which may be used in conjunction with a locator module on a vehicle and which is inexpensive, requires minimal modifications to the locator module, and may be completely concealed in the vehicle.

DETAILED DESCRIPTION OF THE PREFERRED EMBODIMENTS

Wireless control of multiple devices via a singular signal has many useful applications. In a preferred embodiment a first signal is transmitted at a fixed repetition rate from a first transceiver device. The repetition rate (or periodicy) is, for example, once per second. This first signal is modulated prior to transmission to include information of interest to a second transceiver. A second transceiver then receives and demodulates the information embedded in the first signal and transmits a second signal back to the first transceiver device. The second transceiver, for example, is located in a fixed site radio tower—much like a cellular radio tower. The first transceiver then receives and demodulates the information embedded in the second signal and modifies the repetition rate that it transmits its first signal at another rate. The another rate can be a variable rate—say twice per second to once per every 2 seconds. Note that the second transceiver must be designed to be tolerant or insensitive to the variable nature of the transmission repetition rate of the first signal. Another device operating autonomously to the transmission of the first signal can also invoke the change in periodicy of the transmitted first signal. A wireless receiving device detects the another repetition rate of the transmitted first signal. This wireless receiving device then can take some kind of action based on the detection of the variable repetition rate. What action it takes is dependent on the designed application. A key feature of this approach is that the transmitted first signal can contain embedded information useable by the second transceiver and the wireless receiving device simultaneously without using another communication signal or channel as long as the second transceiver is tolerant to the variable repetition rate of the transmitted first signal. This basic technique can be easily extended to include more wireless receivers and more complex repetition rates to wirelessly control more devices.

Certain applications lend themselves to this approach. For example, in a vehicle that is being tracked for its instantaneous geographic position an on-board tracking module transmits a position signal at a periodic rate to a geographically fixed device or site. Note that the geographically fixed device need not be fixed but at least geographically deterministic. Upon sensing the position signal the geographically deterministic site can transmit a control signal back to the mobile vehicle which causes the transmission of the position signal to occur at a non-periodic rate, the periodicity being interpretable by another on-board module which can take some action upon detection of the change in transmission periodicy. Next, a more detailed embodiment will be introduced.

Figure 1:
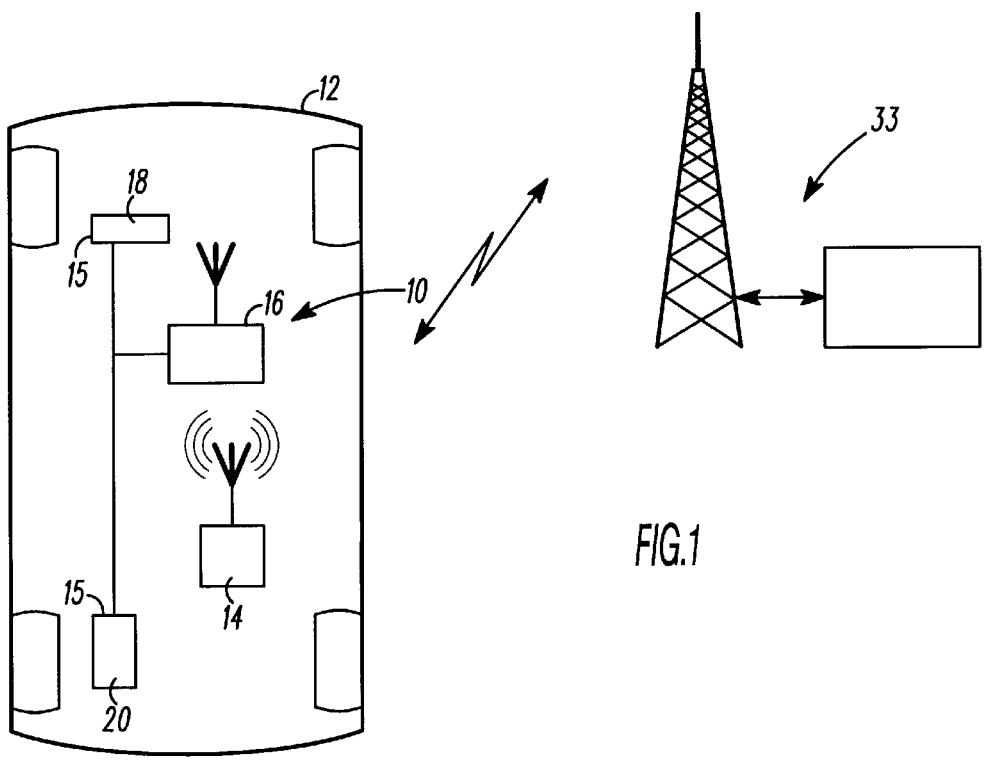
FIG. 1 is a block diagram illustrating a vehicle recovery system in accordance with a preferred embodiment of the present invention installed on a vehicle.

Referring to the drawings, and particularly to FIG. 1, a disabling apparatus 10 includes a disable module 16 connected to an operating system 15 of a vehicle 12. Note that the operating system may be resident in one of many types of electronic modules such as an engine controller, body computer or other phyical platform used to control function and features of the vehicle and its components. The vehicle 12 is also equipped with a locator module 14 that is operable with a location apparatus including a central transmitter 33 and locating towers (not shown). The disable module 16 is selectively actuable to disable the operating system 15, thereby rendering the vehicle 12 inoperable. More specifically the disable module 16 could send a disable signal to a module that was control vehicle motion—such as an engine controller. Responsive to receipt of the disable signal the engine controller would cut off fuel or spark delivery to the vehicle's engine which in turn would stop the vehicle from moving.

The locator module 14 provides vehicle location information. The locator module 14 is responsive to a call signal from the central transmitter 33 to generate a tracking signal. The tracking signal is received by one or more locating towers, and the position of the locator module 14 (and hence the vehicle 12) may be determined by reviewing one or more tracking signal parameters, such as signal strength. In the preferred embodiment, the tracking signal is generated by a frequency modulated very-high frequency (FM VHF) transmitter.

Figure 2:
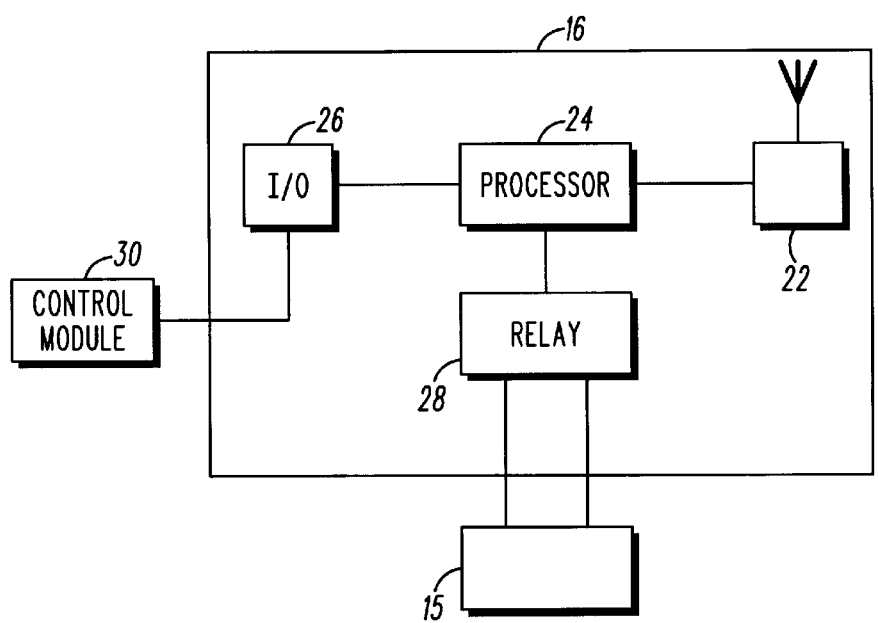
FIG. 2 is a block diagram illustrating the components of a disable module in accordance with a preferred embodiment of the present invention.

The disable module 16 selectively disables the operating system 15 of the vehicle 12. The disable module 16 preferably comprises a receiver 22 adapted to receive the tracking signal generated by the locator module 14 (FIG. 2). The receiver 22 is connected to a processor 24 which, in turn, is connected to an input/output interface 26 and a relay 28. The processor 24 may be a general purpose microprocessor, a digital signal processor (DSP), or an application specific integrated circuit (ASIC). The I/O interface 26 may be connected to a control module 30, such as the engine control module, of the vehicle 12. The relay 28 may be directly connected to the vehicle operating systems 15, such as the ignition 18 or the fuel pump 20 (FIG. 1). The disable module 16 preferably latches the connected operating system 15 in the disabled condition and must be reset before the vehicle 12 is again operable. In operation, the receiver 22 responds to the tracking signal of the locator module 14 to send an output signal to the processor 24. The processor 24 controls the relay 28 thereby to disable the attached vehicle operating system or to send via the I/O interface 26 a signal to the control module 30 to disable its operation. In the preferred embodiment, the receiver 22 is a relatively inexpensive super-regenerative receiver.

Figure 3A:
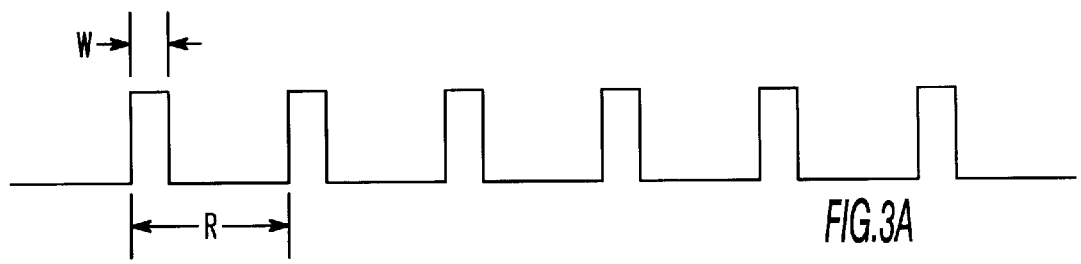
FIGS. 3A and 3B are timing diagrams illustrating standard and modulated pulse signals emitted by a disable module in accordance with a preferred embodiment of the present invention.
Figure 3B:
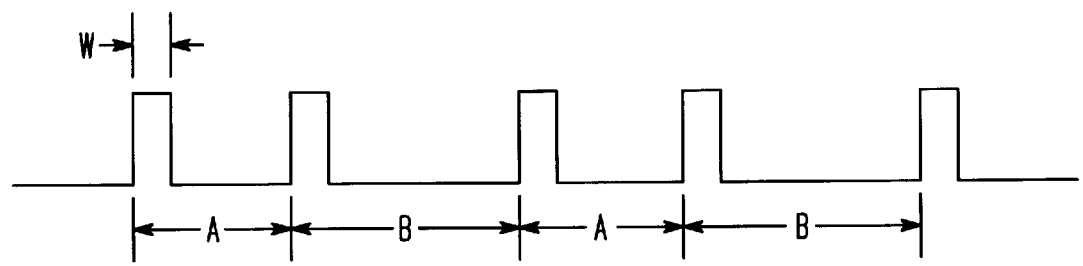

In accordance with certain aspects of the present invention, the tracking signal is modified to provide a simultaneous multi-data stream. Previous locator modules 14 transmit standard tracking signals having substantially consistent pulse widths W generated at substantially consistent pulse rates R (FIG. 3A). In accordance with the present invention, the standard transmission rate is modulated to allow simultaneous transmission of pulsed data to the receiver 22. Accordingly, as best illustrated in. FIG. 3B, the tracking signal is modulated to have different pulse rates A, B. Pulse rate A, for example, may represent a logic "0" while rate B may represent a logic "1." The logic "0" rate may represent a one pulse per second transmission, while the logic "1" rate may represent a transmission once every 1.5 seconds. The modulated pulsed RF signals are particularly suited for the preferred regenerative receiver.

Figure 4:
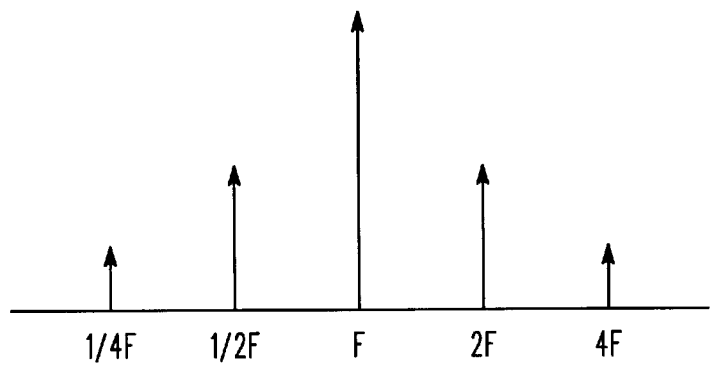
FIG. 4 is a graphical representation of the frequency harmonics associated with a preferred embodiment of the present invention.

The receiver 22 is tuned to a harmonic of the tracking signal thereby to provide interference immunity. As illustrated in FIG. 4, the tracking signal has a frequency F with harmonic frequencies located at discrete magnitudes both higher and lower than F. The frequency F is typically at a conventional police band frequency used to transmit the tracking signal. The receiver 22 is tuned to a harmonic of the frequency F to avoid interference with other transmissions in this band. In the preferred embodiment, the receiver 22 is tuned to the second harmonic 2F which, in the currently preferred embodiment, is approximately 346 Megahertz. Advantageously, the second harmonic falls within a relatively dead band portion of the radio spectrum. It will be appreciated that other harmonics may be selected in accordance with this aspect of the invention to provide interference immunity. The second harmonic, however, provides a higher frequency with a shorter wavelength, and therefore, in addition to enhanced interference immunity, the receiver tuned to the second harmonic may use a shorter antenna.

In accordance with further aspects of the present invention, the modulated transmission rate of the tracking signal is used to transmit data to the disable module 16. Each locator module 14 is assigned a specific vehicle identification code so that the locator module 14 will activate only when a call signal transmitting the specific code is received. The locator module 14 responds by transmitting the tracking signal containing this identification code. In the currently preferred embodiment, the disable module 16 has an activation code identical to the vehicle identification code so that the disable module 16 will activate only when the activation code is transmitted within the tracking signal from the locator module 14. By modulating the transmission rate of the tracking signal to have logic "0" and logic "1" rates, data corresponding to specific vehicle identification codes may be transmitted by the locator module 14 to the disable module 16 via the tracking signal. For the tracking signal illustrated at FIG. 3B, the data transmitted by that signal corresponds to "0101" which would activate a disable module 16 having the same activation code. While modulating the tracking signal in this manner will change the rate at which the tracking signal is received by the location towers, the modulation will not affect the ability to track the signal.

In operation, the locator module 14 will activate when it receives a call signal having the appropriate vehicle identification code data. Once activated, the locator module 14 transmits a tracking signal which simultaneously provides multi-data streams. The tracking signal provides a frequency modulated medium speed data stream and a separate, simultaneous low speed RF pulsed data stream. The location towers receive the frequency modulated data stream which is used to determine the location of the vehicle. The receiver 22 of the disable module 16 is responsive to the radio frequency pulsed data stream thereby to activate the disable module 16. When activated, the disable module 16 operates the relay 28 thereby to disable a vehicle operating system. As a result, the vehicle is no longer capable of moving under its own power, and the tracking signal allows the vehicle to be quickly and easily located.

In view of the foregoing, the present invention brings to the art new and improved disabling apparatus for use with vehicles in conjunction with recovery apparatus. The recovery apparatus includes a locator module which generates a tracking signal to provide information regarding the location of the vehicle. The tracking signal is also modulated to activate the disable module, which is operable to render the vehicle inoperable. As a result, the vehicle may be quickly and easily retrieved. The tracking signal is preferably modified to provide a modulated pulsed RF signal, which does not require additional components in the locator module. The pulsed RF signal may be detected by relatively inexpensive receivers, such as a super-regenerative receiver, thereby minimizing the cost of the disabling apparatus. The disable module is operatively connected to the locator module without the use of wires, thereby allowing the system to be fully concealed. Moreover, many different applications can be derived from the basic teaching detailed here. For example several receivers could be employed to interpret more complex period modulation of the essential transmitted signal.

What is claimed is:

1. A vehicle disabling apparatus for use with a vehicle having a vehicle opening system and in conjunction with recovery apparatus, the recovery apparatus comprising a locator module adapted for attachment to the vehicle and generating a tracking signal having a first modulation and a second modulation, and a location tower adapted to activate in response to the first modulation of the tracking signal to thereby generate vehicle location information, the vehicle disabling apparatus comprising a disable module adapted for connection to the vehicle operating system and operable to disable the operating system, the disable module activating in response to detecting the second modulation of the tracking signal.

2. The vehicle disabling apparatus of claim 1, in which the second modulation is a pulse modulation.

3. The vehicle disabling apparatus of claim 2, in which the first modulation is a frequency modulation.

4. The vehicle disabling apparatus of claim 2, in which the disable module comprises a receiver responsive to the pulse modulation of the tracking signal.

5. The vehicle disabling apparatus of claim 4, in which the receiver is a super-regenerative receiver.

6. The vehicle disabling apparatus of claim 1, in which the disable module has an activation code, the disable module activating when the second modulation constitutes the activation code.

7. The vehicle disabling apparatus of claim 6, in which the tracking signal is modulated between a first pulse rate corresponding to a logic "0" and a second pulse rate corresponding to a logic "1".

8. The vehicle disable system of claim 1, in which the receiver is tuned to a second harmonic frequency of the tracking signal.

9. A method of disabling a vehicle having a locator module and a disable module, the locator module adapted to activate in response to receiving a call signal, the activated locator module generating a frequency modulated tracking signal, the locator module communicating with a location tower this is responsive to frequency modulation of the tracking signal to provide vehicle location information, the disable module connected to a vehicle operating system, the disable module, when activated, adapted to disable the vehicle operating system, the method comprising the steps of:

modifying the tracking signal with pulse modulation; and activating the disable module in response to the pulse modulation of the tracking signal thereby to render the vehicle inoperable.

10. The method of claim 9, in which the disable module includes a super-regenerative receiver responsive to the pulse modulation of the tracking signal.

11. The method of claim 9, in which a pulse rate of the tracking signal is altered during the signal modifying step.

12. The method of claim 11, in which the disable module has an activation code, and the tracking signal is modified to transmit the activation code during the signal modifying step.

13. The method of claim 12, in which the pulse rate of the tracking signal is modulated between a first rate corresponding to a logic "0" and a second rate corresponding to a logic "1".

14. A vehicle disable system for use with a vehicle having an operating system and in conjunction with a recovery system comprising a central transmitter for generating a call signal, a locator module adapted for attachment to the vehicle and responsive to the call signal to generate a tracking signal having both frequency modulation and pulse modulation, and a location tower responsive to the frequency modulation of the tracking signal and adapted to generate location information in response to the tracking signal, the vehicle disable system comprising:

a relay connected to the vehicle operating system and operable to disable the vehicle operating system;

a controller for selectively operating the relay; and a receiver responsive to the pulse modulation and tuned to a harmonic frequency of the tracking signal thereby to activate the controller.

15. The vehicle disable system of claim 14, in which the harmonic frequency to which the receiver is tuned is a second harmonic frequency of the tracking signal.

16. The vehicle disable system of claim 15, in which the receiver is a super-regenerative receiver.

17. The vehicle disable system of claim 14, in which the controller includes a microprocessor.

18. The vehicle disable system of claim 17, in which the disable module has an activation code, and the microprocessor activates the disable module when the tracking signal includes the activation code.

19. The vehicle disable system of claim 18, in which the tracking signal is modulated between a first pulse rate corresponding to a logic "0" and a second pulse rate corresponding to a logic "1".

20. The vehicle disable system of claim 14, in which the vehicle operating system comprises one of a fuel pump and an ignition.

* * * * *

UNITED STATES PATENT AND TRADEMARK OFFICE
CERTIFICATE OF CORRECTION

PATENT NO.    : 6,504,491 B1
DATED         : January 7, 2003
INVENTOR(S)   : Christians, Scott It is certified that error appears in the above-identified patent and that said Letters Patent is hereby corrected as shown below:

<u>Column 5,</u>
Line 21, reads "opening", should be -- operating --.

Signed and Sealed this

Eighth Day of April, 2003

JAMES E. ROGAN
*Director of the United States Patent and Trademark Office*